June 3, 1924.

L. M. PRENTICE

INCLINOMETER

Filed April 14, 1922

1,496,597

INVENTOR.
Lloyd M. Prentice
BY
ATTORNEY.

Patented June 3, 1924.

1,496,597

UNITED STATES PATENT OFFICE.

LLOYD M. PRENTICE, OF MILWAUKEE, WISCONSIN, ASSIGNOR TO STEVENS PRENTICE MFG. CO., OF MILWAUKEE, WISCONSIN, A CORPORATION OF WISCONSIN.

INCLINOMETER.

Application filed April 14, 1922. Serial No. 552,609.

*To all whom it may concern:*

Be it known that I, LLOYD M. PRENTICE, a citizen of the United States, and resident of Milwaukee, in the county of Milwaukee and State of Wisconsin, have invented certain new and useful Improvements in Inclinometers; and I do hereby declare that the following is a full, clear, and exact description thereof.

The invention relates to improvements in inclinometers.

Ordinarily it is desirable to make inclinometers small in size. The smallness of the size and the nature of the scales are such that accurate readings cannot ordinarily be taken.

The invention comprises a weight, and a plate swinging on a shaft that carries the weight. The plate has a vernier scale thereon, adapted to cooperate with a fixed scale. A digitally actuable plunger is provided to impinge against the shaft to assure the accuracy of the reading.

A primary object of the invention is the provision of devices operative to give a very accurate reading. The relationship of the fixed scale to the vernier is such that when the line marked "0" on the vernier coincides with the line next to "0" on the scale, then the inclined angle is 60 minutes, or one whole degree. When the base is in such a position that the line on the vernier next to "0" coincides with the line next but one to "0" on the true scale, the inclined angle is 5 minutes or $\frac{1}{12}$ of a whole degree.

It is therefore apparent that the scales cooperate to give a reading every five minutes. Thus in spite of possibly small dimensions of the inclinometer, a reading of great accuracy is obtainable. To this end also the plunger contributes, adapted to be impelled by the finger against the shaft, so that if the weight has come to rest and the bearings or any other parts operate by friction or in any other manner, to prevent the suspension of the weight in the true line of gravity, the impact of the plunger on the shaft releases the weight and permits it to adjust itself with greater accuracy. Thus a device of great accuracy and sensitiveness is provided.

An object of the structure is the provision of means operative also to dampen the oscillations of the weight. Oftentimes the pendulum will move to and fro, and it is desirable to check its movement. The pressure of the finger on the plunger bringing the lower end thereof in contact with the shaft, checks the movement of the weight in one direction, and when it is released to move back in a reverse direction, its amplitude of movement is decreased, so that the checking of the oscillation is readily accomplished by successive actuations of the plunger by the finger.

An object of the invention also is the ready detachability of the base, so that bases of various dimensions may be substituted. These are useful on various types of work.

With the above and other objects in view which will appear as the description proceeds, my invention resides in the novel construction, combination and arrangements of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of the present invention constructed according to the best mode I have so far devised for the practical application of the principles thereof, and in which.

Figure 3:
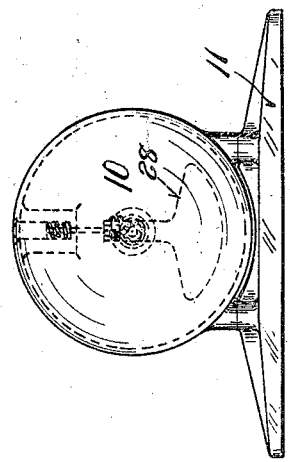
Figure 3 is a rear elevation.
Figure 2:
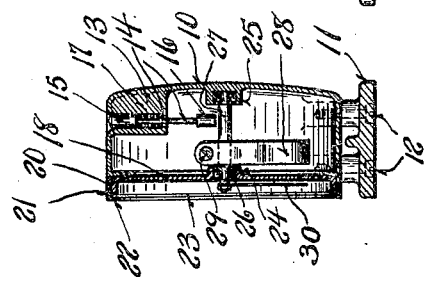
Figure 2 is a central vertical transverse section thereof.
Figure 1:
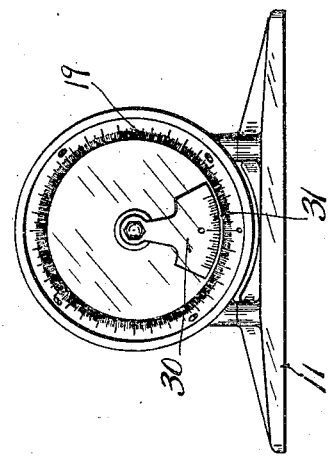
Figure 1 is a front elevation of the novel inclinometer.

Casing 10 is secured to base 11 by means of screws 12, which may readily be removed to permit the substitution of bases of different sizes. On certain types of work, it is desirable to have a high base, on another a low base is desirable. Again, the longitudinal dimensions of the base may be altered.

The casing is provided with an inwardly directed lug 13, chambered to receive a plunger 14, having an enlarged contact 15 at its upper end and a head 16 at its lower end, the spring 17 tending to maintain the contact in elevated position. The plunger 14 is extended thru an opening in the bottom of the channel. The front of the casing has secured to it a closure 18, displaying a scale 19, the closure having a flange 20 in threaded relation with a cap 21, an annular flange 22 of which maintains a glass 23 in position. Closure 18 carries a nipple 24, and casing 10 carries a nipple 25, the nipples receiving ball bearings 26, supporting shaft 27 adjacent head 16. To the shaft is secured a pendular weight 28, the top of which is split and provided with a screw 29, by which the pendulum is secured rigid with shaft 27.

A plate 30 is carried by the end of shaft 27, provided with a vernier 31. When it is desired to ascertain whether a machine or other object is in a horizontal position, the base 11 is placed upon the surface of the machine and will assume a horizontal or inclined position. The pendular weight 28 will always depend in a vertical position, and the vernier will necessarily follow the movement of the weight. Should the surface against which the body is placed be inclined, the "0" marks on the vernier and the fixed scale will be carried out of alinement.

If it is desired to shorten the time of oscillation of the weight, head 16 may be brought in contact with shaft 27 by means of the finger applied to contact 15. This will momentarily arrest the movement of the weight, and decrease its kinetic energy so that its amplitude of travel is decreased. The successive application of head 16 immediately brings the weight to rest. Oftentimes in devices of this general type, the weight, by reason of the action of friction or other factors, comes to rest in such manner as to be slightly disaligned from the line of gravity. In order to prevent the accuracy of the reading from being impaired by this factor, the contact 15 may be struck by the finger, and in this way, shaft 27 is lightly struck. This tends to release the weight which is permitted to realign itself, thus insuring a greater accuracy of reading.

The inclinometer gives us a reading every five minutes or $\frac{1}{12}$ of a degree. When the line marked "0" on the vernier coincides with the line marked "0" on the scale, then the instrument is plumb. When one end of the base has been elevated so that the line on the vernier next to "0" coincides with the line next but one to "0" on the scale, the inclined angle is 5 minutes or $\frac{1}{12}$ of a whole degree. When one end of the base has been elevated so that the line marked "0" on the vernier coincides with the line next to "0" on the scale, then the inclined angle is 60 minutes, or one whole degree. If the base has been tilted or elevated so that the line marked "0" on the vernier is between lines 10 and 11 on the scale, a reading of 10 whole degrees plus some minutes is denoted.

To determine the number of minutes, count the lines from "0" on the vernier in the same direction until you come to the line that coincides with a line on the scale. In this instance, for example, if the 7th line on the vernier would coincide with a line on the scale, multiply 7 by 5, which equals 35, or 35 minutes. This will give you an exact reading of ten degrees and thirty-five minutes.

I claim:

1. The combination of a cylindrical casing, a lug depending therefrom, and having a recess therein, the bottom wall of said recess having an aperture therethru, a rod slidable in said aperture and having a contact member on the end thereof slidable in said recess, a spring between said contact member and said bottom wall, a head on the other end of said rod, a shaft adjacent said head and adapted to be struck thereby on depression of said contact member, means closing the rear of said casing and adapted to support an end of said pivot, a closure located in the forward portion of the casing and supporting the other end of said shaft, said last mentioned end projecting forwardly thru an opening in said closure, a pendular weight rigid with said shaft inwardly of said closure, a plate rigid with said shaft exterior of said closure, said plate having a segmental vernier thereon, said closure having a scale near the edge thereof cooperating with said vernier.

2. The combination of a cylindrical casing, a lug depending therefrom and having a recess therein, the bottom wall of said recess having an aperture therethrough, a rod slidable in said aperture and having a contact member on the end thereof slidable in said recess, a spring between said contact member and said bottom wall, a head on the other end of said rod, a shaft adjacent said head and adapted to be struck thereby on depression of said contact member, a dished rear wall integral with said casing and adapted to support an end of said shaft, a closure located in the forward portion of the casing and supporting the other end of said shaft, said last mentioned end projecting forwardly thru an opening in said closure, a pendular weight rigid with said shaft inwardly of said closure, a plate rigid with said shaft exterior of said closure, said plate having a segmental vernier thereon, said closure having a circular scale near the edge thereof cooperating with said vernier, and a glass disk exterior of said closure and said plate carried by said casing.

In testimony that I claim the foregoing I have hereunto set my hand at Milwaukee, in the county of Milwaukee and State of Wisconsin.

LLOYD M. PRENTICE.